United States Patent Office 3,003,419
Patented Oct. 10, 1961

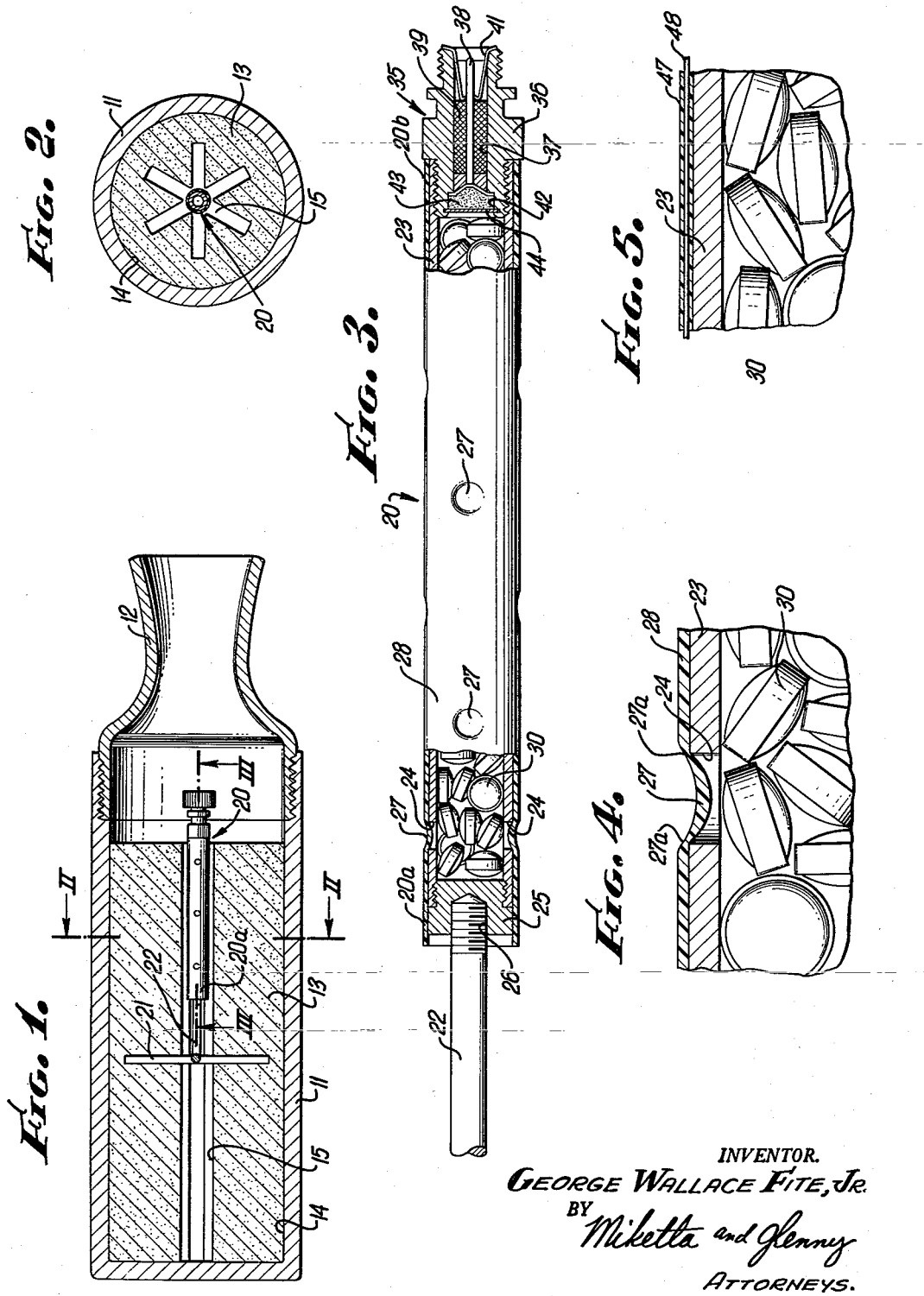

3,003,419
ROD-TYPE PYROGENIC IGNITER
George Wallace Fite, Jr., North Hollywood, Calif., assignor to Mimx Corporation, Glendale, Calif., a corporation of California
Filed June 6, 1960, Ser. No. 34,115
3 Claims. (Cl. 102—86.5)

The present invention relates to a rod-type pyrogenic igniter and more particularly to a rod-type pyrogenic igniter for a solid propellant rocket.

Rockets and rocket engines require relatively few components in comparison to other propulsion devices. However, there are critical relationships among the many variables of these components that are required to be considered in the design of efficient rockets and rocket engines. One of these variables is the amount of pressure created within the combustion chamber of the rockets.

It is highly desirable to have a uniform pressure without dangerous high peaks within the combustion chamber of the rocket during burning of the propellant grain. Knowing the uniform pressure, the combustion chamber wall or the rocket casing may be satisfactorily designed for strength, thickness and weight. This is generally obtained by means of a constant burning area, which is achieved by giving the propellant grain the form of a tube.

As the rate of burning affects the pressure, so pressure affects the rate of burning. The higher the pressure, the faster the propellant grain burns. The rate of gas production by the propellant grain and the rate of gas ejection through the rocket nozzle must be in balance at a pressure below the strength limit of the combustion chamber wall or rocket casing. This means that the ratio of burning area of propellant to throat area in the rocket nozzle—the first a factor controlling gas generation, the second a factor controlling gas discharge—is an important quantity in a rocket or rocket engine design as the equilibrium pressure at which the rocket operates depends principally on it. Therefore, additional pressure or sporadic pressure into the combustion system is undesirable for certain types of solid propellant rockets. However, with other types of propellant grain, it may be necessary to add pressure in order to attain the equilibrium pressure.

The present invention provides an igniter for a solid propellant rocket which may be adapted to ignite the propellant grain without providing any appreciable additional or sporadic pressure prior to or during the combustion period. The igniter device includes a tubular sleeve having a plurality of transverse openings therethrough, each opening being covered by a hermetical seal adapted to fail and to be severed prior to pressure accumulation from combustible pellet means carried in the sleeve.

However, the thickness of the seal at each opening in the igniter sleeve may be varied to therefore control and regulate the pressure-time curve within the solid propellant rocket system. Dependent upon the type of propellant grain used, it may be necessary to sever the seals instantaneously without any appreciable pressure build-up or it may be advantageous to allow pressure to accumulate before the seals are severed. The additional pressure in the latter instance is used to raise the combustion pressure to the most efficient pressure (equilibrium pressure) at which the specific propellant grain will burn. The thickness of the seals are therefore varied to fail quickly or slowly. In either instance, pressure is not used to sever the seals; but sufficient heat such as infrared rays is the means for causing the seals to fail and for igniting the propellant grain.

Accordingly, it is a general object of the present invention to provide a rod-type igniter for solid propellant rockets or rocket engines which will ignite the solid propellant grain without the addition of any substantial pressure prior to or during the combustion process.

An object of the present invention is to provide a novel rod-type igniter for solid propellant rocket or rocket engines.

Another object is to provide a rod-type igniter for solid propellant rocket or rocket engines and which is adapted to be varied so as to control the pressure-time curve within a solid propellant system dependent upon the materials used.

Other objects and many of the attendant advantages of this invention will be readily appreciated as the same become better understood by reference to the following detailed description when considered in connection with the accompanying drawings wherein:

FIG. 1 is a longitudinal section through a solid propellant rocket containing an exemplary igniter device of the present invention;

FIG. 2 is a transverse section of the rocket taken along plane II—II of FIG. 1;

FIG. 3 is an enlarged, partly sectioned view of an exemplary igniter device of the present invention;

FIG. 4 is an enlarged, fragmentary section of the device of FIG. 3; and

FIG. 5 is a fragmentary section of another embodiment of a device of the present invention.

Although it is contemplated that the pyrogenic igniter device of the present invention may be used in many devices, it is particularly adapted for use with a solid propellant rocket. Such a solid propellant rocket is shown in FIG. 1 and includes an outer hollow rocket casing 11 closed at its front end and open at its rear end. A suitably shaped exhaust nozzle 12 having a pre-designed throat area is provided on the open rear end of the rocket for receiving and exhausting hot gases from a rocket propellant grain 13 carried within the combustion chamber 14 in the hollow rocket casing 11.

The solid propellant 13 may be of many shapes or internal configurations but is generally tubular having a port area or hollow core 15. It is understood and is well known in the art that a typical solid propellant grain is cured into shape which conforms to a combustion chamber of a rocket engine and has a mixture of solid fuel and oxidizer. Propellant grains of different material and shape have different combustion characteristics among which is the most efficient combustion pressure or equilibrium pressure. Some propellant grains require a much greater combustion pressure than others. When ignited, the propellant grain burns at a nearly constant rate on all exposed surfaces and causes exhaust gases to pass outwardly through the nozzle 12. A suitable converging-diverging nozzle 12 tends to cause the exhaust gases to increase in velocity and prodce the reaction force necessary to propel the rocket in the opposite or forward direction.

A rod-type pyrogenic igniter device 20 is provided within the combustion chamber 14 for igniting the rocket propellant grain 13. As shown in FIG. 1, the igniter device 20 is received within the hollow core 15 of the propellant grain 13 and may be rigidly held in axial alignment therein by means of an igniter holding device or web means 21 which may be suitably embedded within the propellant grain 13 during the forming and curing of the grain into its desired shape. The holding device 21 may have an axial-extending supporting rod 22 which is adapted to be threadedly received in the forward end 20a of the igniter device 20.

The pyrogenic igniter device 20 may include a tubular sleeve 23 having a plurality of transverse openings 24 therethrough and is hermetically sealed at its forward end 20a by means of a plug member 25. This plug member 25 has a threaded central recess 26 for threadedly receiving the supporting rod 22 of the igniter holding device 21.

The transverse openings 24 in the sleeve 23 may vary in diameter, number, location and shape dependent upon the specific type of propellant grain used. The openings 24 determine the initial area of the propellant grain that is ignited which is a factor in determining the total time in which the propellant grain will burn.

A hermetical seal 27 preferably under tension is provided for sealing and covering each opening 24 through the tubular sleeve 23. It is preferred that the hermetical seal 27 be part of a continuous outer thermoplastic layer 28 which is bonded to the outer surface of the sleeve 23 by thermosetting material thus covering and sealing the openings 24. While there are many materials and methods that may be used for hermetically sealing the openings 24, it is preferred that a cross-linked thermoplastic material such as polyethylene be used. An epoxy bonding coating may be sprayed over the outer surface of the tubular sleeve 23 before the polyethylene layer is applied. For ease of applying, the polyethylene may be cross-linked by means of irradiation processes so that the outer layer 28 may be stretched to a diameter greater than the outer diameter of the sleeve 23. At this condition, the thermoplastic material is in its crystalline melting stage due to the cross-linking process. After the sleeve 23 is inserted into the polyethylene layer 28, the cross-linked polyethylene is shrunk onto the sleeve 23 and is firmly and hermetically sealed thereto by means of the epoxy bonding layer.

With the rear end 20b of the igniter device open, a vacuum is then applied (by suitable means) to the interior of the sleeve 23 causing the hermetical seals 27 across the openings 24 to be drawn inwardly. This deforms the material and stretches the cross-linked thermoplastic into a material under tension. Each of the hermetical seals 27 thus forms a thin annular meniscus section at its respective opening 24 which is under tension and has a thinner annular section 27a adjacent the edges of the opening 24. This provides a seal of sufficient tensile strength to resist being ruptured from a substantial increase in pressure within sleeve 23. It is understood that the meniscus portions of the hermetical seals 27 have predetermined thicknesses correlated to fail and to be severed within a predetermined time which in certain instances is prior to a substantial pressure accumulation within the sleeve after combustible means 30 are combusted. By thus regulating the thicknesses of the meniscus portions of the hermetical seals 27, the pressure-time curve can be controlled for the ignition of each type of rocket propellant grain 13. It is preferred that the thermoplastic layer 28 is black to thus provide a black body for each seal 27 for more readily attracting heat from the combustible means 30 after they are combusted.

The combustible means 30 for severing the hermetical seals 27 of each opening 24, may comprise various and well known materials. However, it is preferred that the combustible means are pellets of boron-potassium nitrate which when combusted radiate infra-red rays for instantaneously severing the hermetical seals 27. The use of means for producing infra-red rays prevents pressure due to combustion from accumulating and causes the seals 27 to fail instantly (within micro-seconds) after the means 30 are ignited.

Different types and shapes of propellant grain require different effective combustion pressures. Therefore, by making the hermetical seal sections 27a thin, the infra-red rays will cause the seals 27 to fail instantaneously before any substantial pressure accumulation. This prevents the addition of any substantial pressure to the combustion system for that particular propellant grain. However, with other types of propellant grains, a higher combustion pressure is required. Therefore, the thicknesses of the hermetical seal sections 27a are thicker requiring a slightly longer period of time to elapse before the seals 27 fail. Therefore, pressure builds up or is retained in the sleeve 23 after the combustible means 30 are ignited. When the infra-red rays finally sever the thicker seal sections 27a, this reservoir of pressure is released and is used to provide the higher combustion pressure necessary in which this type of propellant grain needs to burn most efficiently. It is understood that in the latter instance, seconds or only a few micro-seconds may elapse before the seals are finally severed. Therefore, by controlling the thickness of the meniscus seal sections 27a, the pressure-time curve of a particular propellant grain may be controlled. The thicknesses of the meniscus seal sections are therefore correlated to the type of propellant grain used so as to fail at a predetermined time for controlling the addition of pressure to the combustion system of the solid propellant rocket.

A squib or means for igniting the boron-potassium nitrate pellets 30 is provided on the rear open end 20b of the igniter device 20. The squib 35 is of standard construction and is well known to those skilled in the art. The squib 35 has a hollow casing 36 provided with a central bore 37 for receiving an axially extending burnable electrode 38. The burnable electrode 38 may be supported within the bore 37 by means of a glass seal 39 retained within the casing 38 by suitable ground wire 41. On the inner end of the squib 35, a central recess 42 may be provided for receiving a plurality of combustible pellets or particles such as lead-stephanite or boron-potassium nitrate. These combustible particles may be retained within the chamber 42 by means of a frangible retaining disc 44.

The electrode 38 is connected to a remote control electrical impulse system which may be actuated to burn the electrode 38, ignite the particles 43 which will cause the frangible retaining disc 44 to be severed. The heat and flames from the combusted particles 43 will ignite the combustible means 30 retained within the igniter device 20 causing the hermetical seals 27 to be severed for igniting the solid propellant rocket grain 13. It is understood that the squib means 35 forms no part of the present invention and therefore is not shown or described in detail.

As will be easily understood by those skilled in the art, it is extremely important to eliminate surface static electricity or charges on the igniter device 20 before it is inserted into the hollow core 15 of the rocket propellant grain 13. In FIG. 5, another embodiment of the present invention is shown and includes an outer layer 47 of preferably thermoplastic material for sealing and covering the transverse openings through the tubular sleeve 23 in accordance with the description of the device in FIGS. 1–4. However, the thermoplastic sealing layer 47 includes an electrical grounding conductor 48 which may be embedded therein for conducting the surface static electricity to the rear end of the igniter device. This conductive electrical grounding conductor 48 may be in the form of a series of spaced wires or a layer of conducting material for preventing the igniter device from being in a semi-charged condition before being inserted into the solid propellant grain 13.

It can therefore be seen that the pyrogenic igniter device of the present invention can cause instantaneous ignition of the rocket propellant without the addition of any substantial pressure prior to or during the combustion process. This allows a solid propellant rocket to be designed and built knowing beforehand the uniform pressure during combustion. This uniform pressure is generally known as the equilibrium pressure at which the rocket operates after the ignition of the rocket propellant grain. By regulating the thickness of the meniscus of each of the hermetical seals 27, the pressure-time curve of the solid propellant rocket may be controlled dependent on the characteristics of the rocket. By having thinner sealing sections of sufficient tensile strength, the seals will be severed rapidly in response to the infra-red rays but will not fail due to pressure. If the sealing sections are thicker, pressure will be allowed to accumulate and later be supplied to the propellant grain to increase the effective combustion pressure at which certain types of propellant grain will burn more efficiently.

The igniter devices of the present invention are economically manufactured and may be used in other devices than solid propellant rockets where it is required to ignite a combustible material by controlling the combustion pressure.

Obviously, many modifications and variations of the present invention are possible in the light of the above teachings. It is therefore to be understood that within the scope of the appended claims the invention may be practiced otherwise than as specifically described.

I claim:

1. A rod-type pyrogenic igniter adapted to be used with a solid propellant rocket, comprising: a tubular sleeve having a plurality of transverse openings therethrough and being hermetically sealed at one end thereof, a continuous, shrunken cross-linked thermoplastic layer hermetically bonded to the outer surface of said sleeve by a thermosetting material to cover and hermetically seal said openings, that portion of the thermoplastic layer sealing each opening being under tension and forming a meniscus having a thinner annular section adjacent the edges of the opening and having sufficient tensile strength to resist being severed by a substantial increase in pressure, combustible pellet means for producing infrared rays within said sleeve, and a squib means hermetically connected to the other end of said sleeve for combusting the pellet means whereby the thin annular meniscus sections at the openings through the sleeve are adapted to fail and to be severed.

2. In a rod-type igniter as stated in claim 1, wherein said thermoplastic layer is black to provide a black body for more readily attracting heat from the pellet means when combusted.

3. In a rod-type igniter as stated in claim 1, including an electrical grounding conductor embedded in said thermoplastic layer for preventing the igniter from being in a charged condition prior to insertion into the rocket propellant.

References Cited in the file of this patent

UNITED STATES PATENTS

| | | |
|---|---|---|
| 1,946,780 | Costello | Feb. 13, 1934 |
| 2,446,187 | Meister | Aug. 3, 1948 |
| 2,697,325 | Spaulding | Dec. 21, 1954 |
| 2,779,284 | Kane | Jan. 29, 1957 |
| 2,926,607 | Muller et al. | Mar. 1, 1960 |
| 2,959,001 | Porter | Nov. 8, 1960 |